United States Patent
Nguyen

(10) Patent No.: US 7,698,481 B1
(45) Date of Patent: Apr. 13, 2010

(54) FIBRE CHANNEL ELASTIC FIFO DELAY CONTROLLER AND LOOP DELAY METHOD HAVING A FIFO THRESHOLD TRANSMISSION WORD ADJUSTER FOR CONTROLLING DATA TRANSMISSION RATE

(75) Inventor: Hung M. Nguyen, Westminster, CA (US)

(73) Assignee: Marvell International Ltd., Hamilton (BM)

( * ) Notice: Subject to any disclaimer, the term of this patent is extended or adjusted under 35 U.S.C. 154(b) by 221 days.

(21) Appl. No.: 11/855,113

(22) Filed: Sep. 13, 2007

Related U.S. Application Data

(60) Provisional application No. 60/825,526, filed on Sep. 13, 2006.

(51) Int. Cl.
G06F 3/10 (2006.01)
G06F 13/00 (2006.01)

(52) U.S. Cl. .............................. 710/57; 710/52; 710/53; 711/110; 370/229; 370/407; 709/232; 709/236

(58) Field of Classification Search .................. 710/52, 710/53, 57; 711/110; 370/229, 407; 709/232, 709/236
See application file for complete search history.

(56) References Cited

U.S. PATENT DOCUMENTS

| | | | |
|---|---|---|---|
| 5,771,356 A * | 6/1998 | Leger et al. ................. 709/233 |
| 5,822,540 A * | 10/1998 | Caldara et al. .............. 709/236 |
| 6,167,452 A * | 12/2000 | Manning et al. ............ 709/232 |
| 6,256,674 B1 * | 7/2001 | Manning et al. ............ 709/232 |
| 6,353,604 B2 * | 3/2002 | Grimwood et al. .......... 370/335 |
| 6,408,349 B1 * | 6/2002 | Castellano .................... 710/56 |
| 6,529,971 B1 * | 3/2003 | Thiesfeld ...................... 710/53 |
| 6,978,344 B2 * | 12/2005 | Schauer ...................... 711/110 |
| 7,028,280 B1 * | 4/2006 | Liu et al. ........................ 716/8 |
| 7,272,527 B1 * | 9/2007 | Suto et al. .................... 702/108 |
| 7,461,284 B2 * | 12/2008 | Thompson et al. .......... 713/500 |
| 7,472,318 B2 * | 12/2008 | Fan et al. ..................... 714/704 |

\* cited by examiner

*Primary Examiner*—Tammara Peyton

(57) ABSTRACT

In a circuit coupled to a port of a network having a loop architecture, a read/write pointer controller provides a read and a write pointer to track transmission words stored in a FIFO array. The read/write pointer controller also provides a FIFO level indicator to track the total number of transmission words in the FIFO array. A dynamic threshold controller tracks transmission word insertions and deletions in the FIFO array for a predetermined period of time and provides a threshold level adjustment signal based on the tracked transmission word insertions and deletions and a transmission word threshold level. A FIFO level adjuster provides transmission word insert and delete commands and adjusts the threshold level of the FIFO array in response to the threshold level adjustment signal.

25 Claims, 3 Drawing Sheets

FIBRE CHANNEL ELASTIC FIFO DELAY CONTROLLER AND LOOP DELAY METHOD HAVING A FIFO THRESHOLD TRANSMISSION WORD ADJUSTER FOR CONTROLLING DATA TRANSMISSION RATE

CROSS REFERENCE TO RELATED APPLICATIONS

The present application claims the benefit of co-pending U.S. provisional application Ser. No. 60/825,526, filed on Sep. 13, 2006, the disclosure of which is incorporated herein by reference in its entirety.

BACKGROUND OF THE INVENTION

1. Field of the Invention

This invention relates generally to a fibre channel arbitrated loop, and more particularly to a fibre channel elastic FIFO delay controller.

2. Description of the Related Art

Fibre channel is an industry-standard interface adopted by the American National Standards Institute (ANSI) and primarily is used for storage networking. A fibre channel arbitrated loop (FC-AL) is a loop architecture that can have up to a maximum of 126 nodes or ports, such as server or storage elements, connected together by a loop. FC-ALs use a serial interface to transmit data and control signals from port to port. As data is transmitted from port to port in the FC-AL, the data may be delayed by an elasticity buffer or FIFO array found in each FC-AL port to account for the differences between a port's incoming and outgoing data rate.

In other network topologies, FIFO arrays or buffers may be permitted to operate while empty. However, FC-AL standards require an indication that the decrease of a buffer's contents by one transmission word signifies an urgent condition, or that a two-word decrease signifies a very urgent condition. From these requirements, an FC-AL port's FIFO will maintain at least 3 transmission words to account for the differences in upstream and downstream device data rates. A transmission word used in a FC-AL port is composed of four contiguous transmission characters. One example of a transmission word is a fill word, with the fill word being an idle signal transmitted being data frames. The fill word is composed of four fill characters, with each fill word being equal to 40 bits. The fill word may be inserted or deleted from the FIFO between data frames, depending on the differences in upstream and downstream device data rates. A maximum delay, or latency, for a port in a FC-AL may be 6 fill words, or 240 bits. Accordingly, one measurement of the performance of a fibre channel arbitrated loop is the loop delay per loop port.

Typically, a FC-AL Elastic Loop FIFO may handle the data rate differences (incoming and outgoing) between a port by maintaining a threshold level of 3 transmission words. When the data rate from an upstream device is faster, the downstream device needs to delete a transmission word between data frames to keep the FIFO from overflowing. If the data rate of the upstream device is slower, the downstream device needs to insert a transmission word between data frames to keep the FIFO from underflowing. With this type of FIFO operation, FC-AL network performance may not be improved, as upstream or downstream devices need to delete or insert transmission words to keep the FIFO threshold level at 3 transmission words. However, if the data transfer rate of an upstream device is known, FC-AL network performance may be improved by dynamically reducing the FIFO threshold level while still maintaining the proper data transfer rate offset between an upstream and a downstream device.

Therefore, it would be desirable to have an apparatus that can dynamically reduce the Elastic Loop FIFO threshold level, thereby reducing the loop delay per loop port in a fibre channel arbitrated loop.

SUMMARY OF THE INVENTION

To address the stated need and fulfill other desired objectives, in accordance with one embodiment of the invention, a circuit coupled to a port of a network having a loop architecture includes a read/write pointer controller, a dynamic threshold controller, and a FIFO level adjuster. The read/write pointer controller may provide a read and a write pointer for tracking transmission words stored in a FIFO array, as well as a FIFO level indicator to track the total number of transmission words stored in the FIFO array. The dynamic threshold controller may track transmission word insertions and deletions in the FIFO array over a predetermined time period and may output a threshold level adjustment signal. The FIFO level adjuster may receive the threshold level adjustment signal and provide insert and delete commands to insert or delete transmission words from the FIFO array. The FIFO level adjuster also may adjust the FIFO array threshold level using the insert and delete commands in response to the threshold level adjustment signal.

DETAILED DESCRIPTION OF EMBODIMENTS

Figure 1:
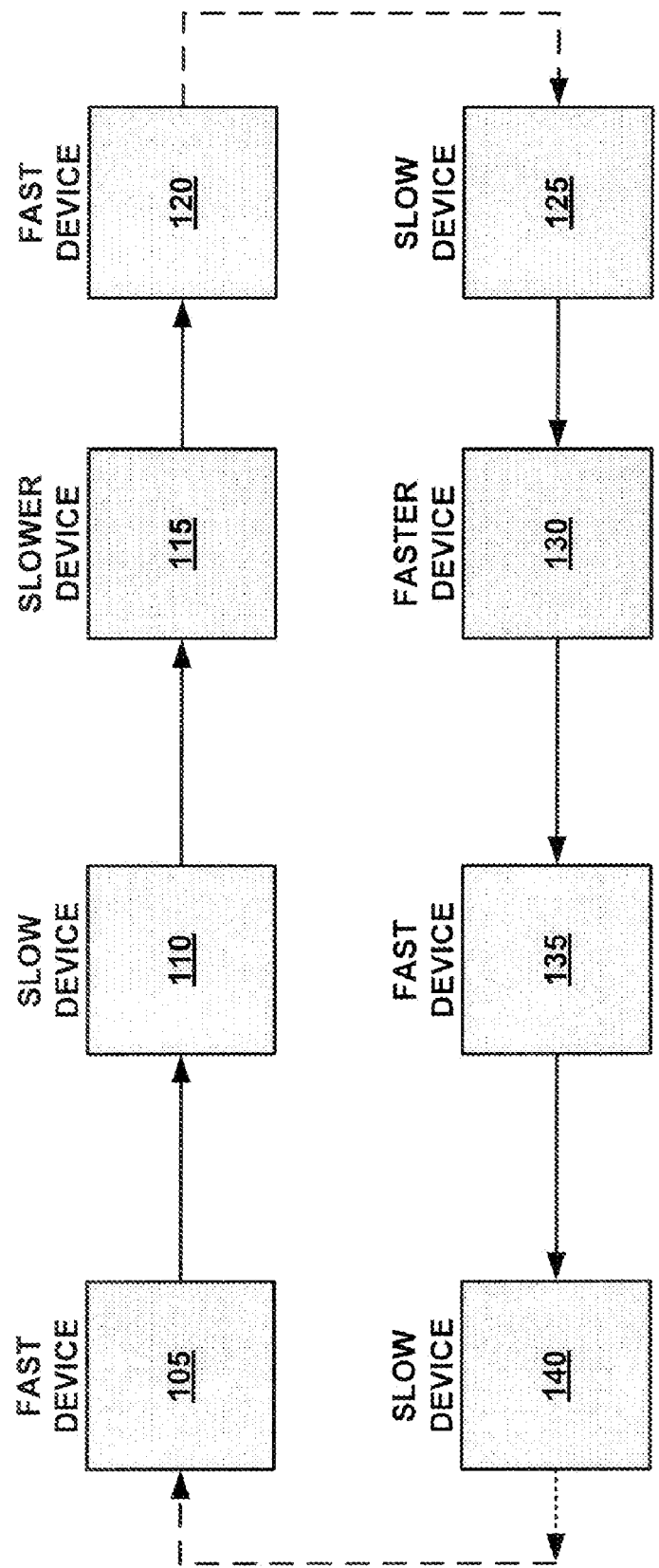
FIG. 1 illustrates a simplified block diagram of an embodiment of a fibre channel arbitrated loop.

FIG. 1 illustrates a simplified block diagram of an embodiment of a fibre channel arbitrated loop (FC-AL). According to current FC-AL standards, up to 126 devices may be connected to a fibre channel arbitrated loop. Each device connected to the loop may use an elastic loop FIFO array to buffer incoming and outgoing data to account for differing data transmission rates between devices. Each loop FIFO may have a maximum storage capacity (i.e., maximum delay) of six transmission words, but generally the delay for each port in a FC-AL is set at three transmission words, in view of currently applicable FC-AL standards regarding when a FIFO fill condition is considered "urgent" or "very urgent". Different devices connected to the loop (e.g., servers, disk drives) may transmit data at different rates. This situation is generally depicted in FIG. 1, with certain devices being "fast" devices 105, 120, 135 relative to other "slow" 110, 125, 140 or "slower" 115 devices. For situations where an upstream device has a faster data transmission rate than a downstream device, such as between devices 105 and 110, the downstream device may buffer data in the loop FIFO faster than it outputs data. As a result, to prevent the loop FIFO from overflowing, the downstream device may have to delete a transmission word in the loop FIFO between data frames. For situations where a upstream device has a slower data transmission rate than a downstream device, such as between devices 115 and 120, the downstream device may need to insert a transmission word, such as a fill word, in the loop FIFO to prevent the loop FIFO from underflowing.

It should be noted that the sequence of devices in the loop in FIG. 1 may change as devices are added to or subtracted from the loop. Consequently, transmission relationships between consecutive devices in the loop can change, not just because transmission rates can vary for a given device at different times, but also because the devices can enter or leave the loop at different times.

As the loop delay per loop port in a FC-AL is one measurement of FC-AL performance, the loop delay per loop port may be improved for situations where an upstream device consistently transmits data at a faster rate than a downstream device. Performance of the FC-AL may be improved by reducing the loop FIFO threshold level of three transmission words to take advantage of the faster upstream transmission rate. By reducing the FIFO threshold delay, the frequency of transmission word deletions from the FIFO may be reduced, thereby reducing the delay of the loop port and improving its performance.

Figure 2:
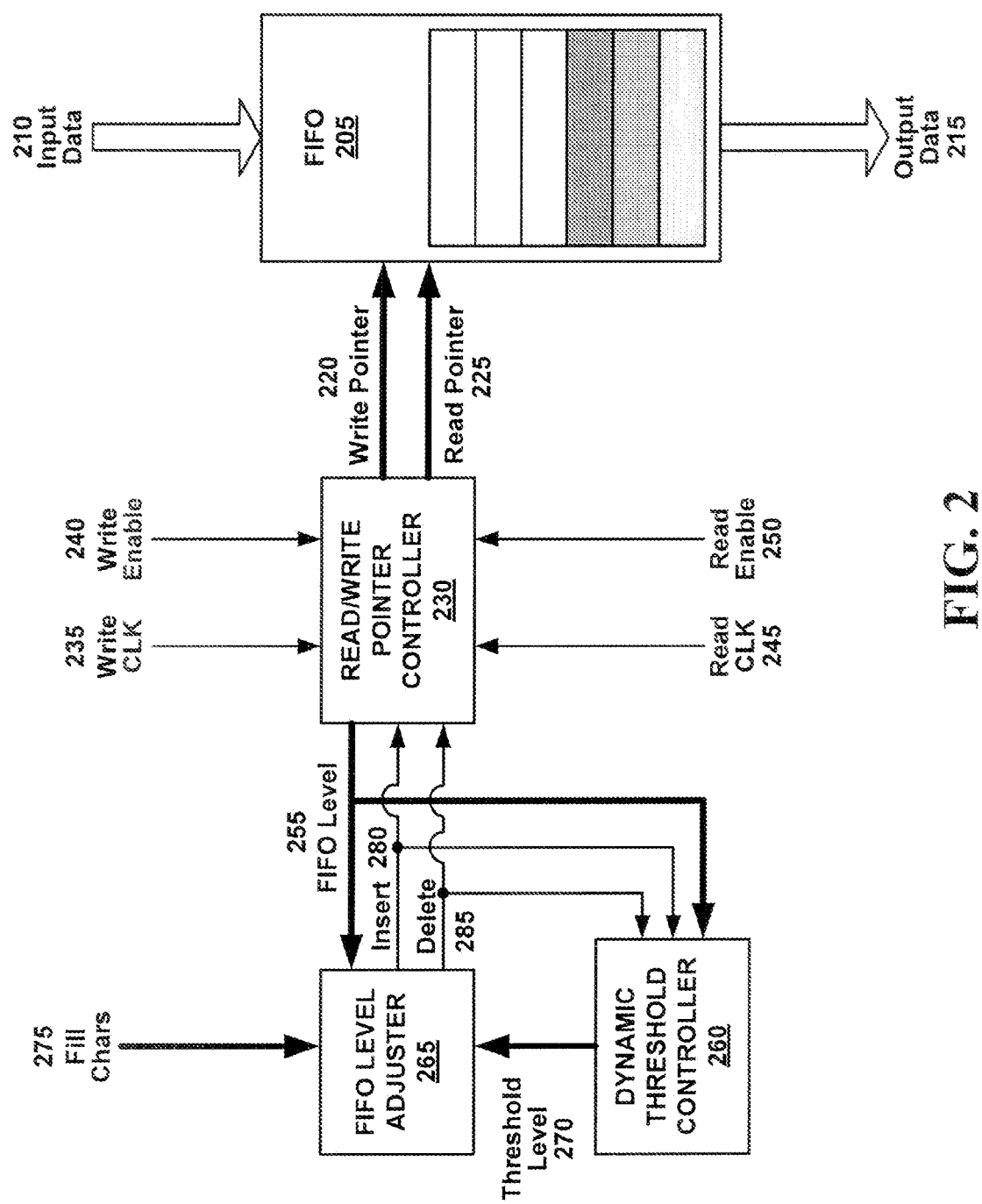
FIG. 2 illustrates a block diagram of one embodiment of a circuit coupled to a loop port in a fibre channel arbitrated loop to improve the loop delay per loop port.

FIG. 2 illustrates a block diagram of one embodiment of a circuit coupled to a loop port in a fibre channel arbitrated loop to improve the loop delay per loop port. In this embodiment, the circuit may include an elastic loop FIFO array 205, a read/write pointer controller 230, a dynamic threshold controller 260, and a FIFO level adjuster 265. The FIFO 205 may receive input data 210 from an upstream device in the FC-AL, and may transmit output data 215 to a downstream device in the FC-AL. The FIFO 205 may buffer the received input data 210 to account for differences in data transmission rates between upstream and downstream devices. To account for such data transmission differences, the FIFO 205 may store up to six transmission words, such as fill characters. A minimum threshold number of transmission words may be required to be stored in the FIFO 205 when buffering incoming data. In one embodiment, the default FIFO threshold level may be three transmission words. As a consequence of the fibre channel arbitrated loop standard, while the FIFO may store up to six transmission words, it may be forced to operate with at least one transmission word. Unadjusted, the FIFO threshold level of three transmission words may properly buffer and account for data transmission rate differences between a upstream device transmitting data slower relative to a downstream device.

A read/write pointer controller 230 may receive read and write clock signals 245, 235 and read and write enable signals 250, 240 and may provide a read pointer 225 and a write pointer 220 to the FIFO 205. The read pointer 225 may identify the address of the next transmission word or the next transmission word itself to be read. The write pointer 220 may identify the address where the next transmission word is to be written. The read and write clock signals 245, 235 may synchronize the read and write operations of the circuit such that read and write operations only occur upon the rising or falling edge of a clock signal. Similarly, the read and write enable signals 250, 240 may dictate when read and write operations are allowed to occur. In one embodiment, a read operation may not occur unless both a read clock signal 245 and a read enable signal 250 are received by the read/write pointer controller 230. Similarly, a write operation may not occur unless both a write clock signal 235 and a write enable signal 240 are received by the read/write pointer controller 230. The read/write pointer controller 230 may also provide a FIFO level indicator 255 to indicate how many transmission words are stored in the FIFO 205 at a given time.

A dynamic threshold controller 260 may improve the performance of the loop port and the FC-AL by enabling a dynamic threshold mode that adjusts the threshold level of the FIFO 205 in response to the occurrence of certain scenarios. The dynamic threshold controller 260 may receive the FIFO level indicator 255 from the read/write pointer controller 230 and may also track FIFO transmission word insertions 280 and deletions 285. Based on the FIFO level indicator 255 and the FIFO transmission word insertions 280 and deletions 285, the dynamic threshold controller 260 may provide a threshold level adjustment signal 270.

If the dynamic threshold controller 260 tracks only transmission word deletions 285 in the FIFO 205 during a predetermined programmable time period, the dynamic threshold controller 260 may output a threshold level signal 270 having a lower threshold than the current FIFO threshold level. This threshold level adjustment signal 270 may instruct a FIFO level adjuster 265 to reduce the threshold level of the FIFO 205 to the value of the threshold level signal by issuing transmission word deletion 285 commands. The occurrence of only transmission word deletions in the FIFO 205 during the entire programmable period of time may indicate that an upstream device is consistently transmitting data at a faster rate than data is being transmitted downstream. As described above, for this scenario, the FIFO threshold level may be decremented from three words to two words or from two words to one word. By maintaining a smaller threshold number of transmission words, the delay through the loop port is smaller, and consequently, the performance of all local loop ports is improved.

If the dynamic threshold controller 260 detects a transmission word insertion 280 during the programmable time period, the dynamic threshold controller 260 may turn off the dynamic FIFO threshold mode as the precondition for the mode has not occurred. The threshold level adjustment signal 270 may instruct the FIFO level adjuster 265 to maintain the FIFO threshold level at three transmission words if the threshold level has not yet been altered. Alternatively, if the threshold level has already been reduced from three transmission words, the threshold level adjustment signal 270 may raise the FIFO threshold level from one transmission word to two transmission words or from two transmission words to three transmission words. The presence of one or more transmission word insertions 280 may indicate to the dynamic threshold controller 260 that the upstream device may not be transmitting data at a faster rate than the rate data is being transmitted downstream. Accordingly, the FIFO threshold level may need to be raised to prevent the FIFO 205 from underflowing or overflowing depending on the upstream and downstream data transmission rates.

The dynamic threshold controller 260 may monitor FIFO transmission word insertions and deletions on a regular or even substantially continual basis, and may dynamically adjust the threshold transmission word level regardless of whether faster or slower devices are connected to the upstream loop port. If a slower device is connected to the upstream loop port in place of a previously faster device, the dynamic threshold controller 260 may track transmission word insertions in the FIFO and adjust the transmission word threshold level to reflect the slower device. If a faster device is connected to the upstream port in place of a slower device, the dynamic threshold controller 260 may track little or no transmission word insertions in the FIFO and may dynamically lower the transmission word threshold level to improve performance of the loop port. Similarly, the dynamic threshold controller 260 may adjust the FIFO transmission word threshold level in response to slower or faster devices connected to the downstream loop port.

The FIFO level adjuster 265 may receive the FIFO level indicator 255 from the read/write pointer controller 230, the threshold level adjustment signal 270 from the dynamic threshold controller 260, and detected transmission words 275 from the elastic FIFO (not shown). The FIFO level adjuster 265 may provide insert 280 and delete 285 instructions or commands to the read/write pointer controller 230 to insert or delete transmission words in the FIFO 205. The insert 280 and delete 285 instructions may also be provided to the dynamic threshold controller 260 to enable the dynamic threshold controller 260 to track the sequence of transmission word insertions and deletions for a given time period. The FIFO level adjuster 265 may reduce the FIFO threshold level in response to a threshold level adjustment signal 270 having a lower threshold value than the current threshold value by adjusting the number of transmission word insertion 280 and deletion 285 commands issued. Similarly, the FIFO level adjuster 265 may maintain or raise the FIFO threshold level in response to a threshold level adjustment signal 270 having a threshold value equal to or higher than the current threshold value by adjusting the number of fill character insertion 280 and deletion 285 commands issued. If the FIFO threshold level has been previously lowered, the FIFO level adjuster 265 may raise the FIFO threshold level. Otherwise, the FIFO level adjuster 265 may maintain the threshold level at its current level.

Figure 3:
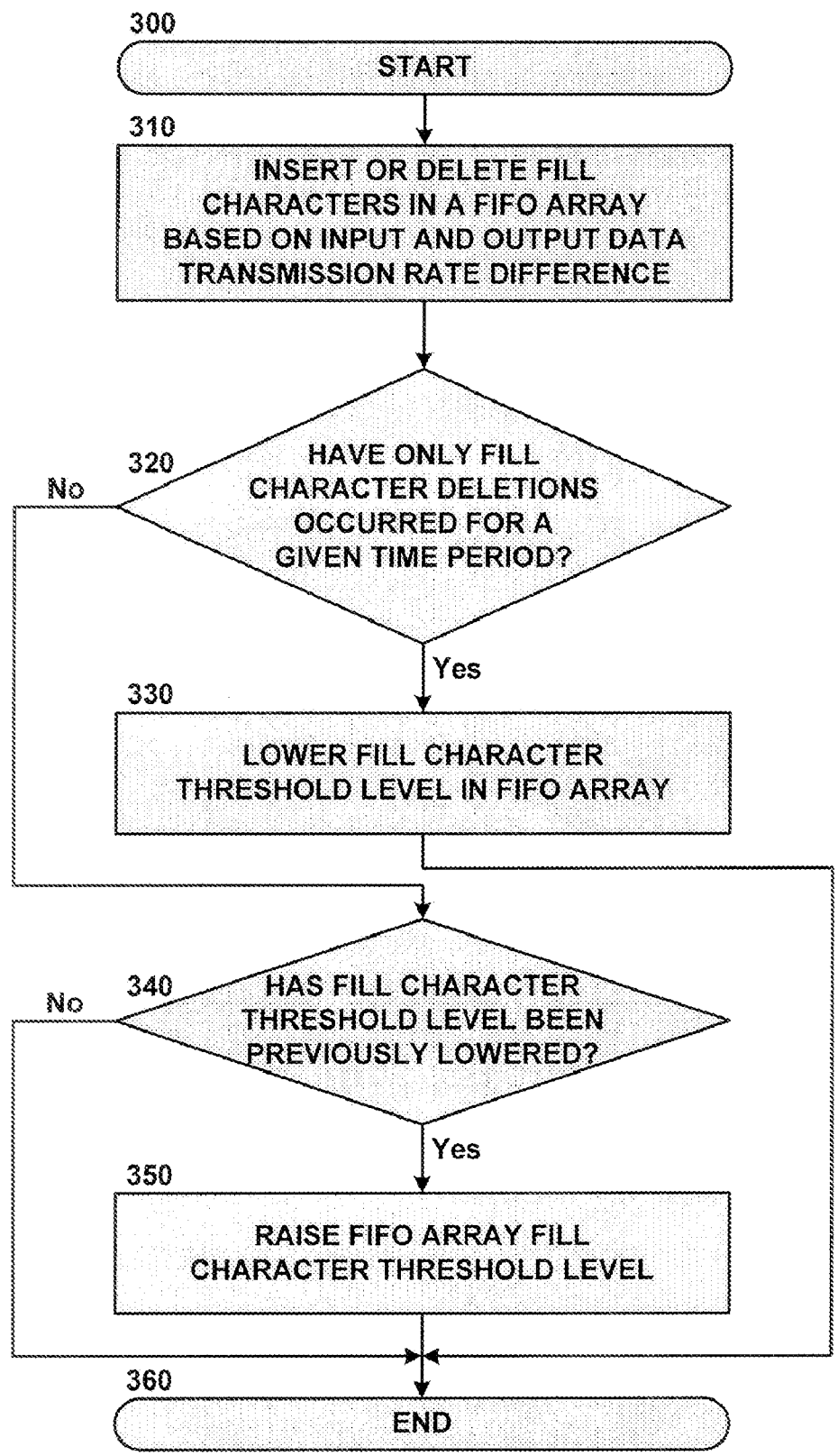
FIG. 3 is a flowchart showing one embodiment of the inventive method for improving the loop delay per loop port in a fibre channel arbitrated loop.

FIG. 3 is a flowchart showing one embodiment of the inventive method for improving the loop delay per loop port in a fibre channel arbitrated loop. In block 310, transmission words, such as fill characters, may be inserted into or deleted from a FIFO array 205 as input data 210 is received and output data 215 is transmitted. The insertion or deletion of transmission words into the FIFO array 205 may depend on a data transmission rate difference between the rate input data 210 is received and the rate output data 215 is transmitted downstream. Transmission words may be inserted into or deleted from the FIFO array 205 to account for the differences in data transmission rates. This insertion or deletion may help buffer the data received by a loop port in a FC-AL. The insertion or deletion of transmission words in a FIFO array 205 also may prevent the FIFO 205 from underflowing or overflowing while data is received and transmitted by a loop port. The FIFO array 205 may have a threshold level for transmission words such that the FIFO array 205 must always have at least the threshold number of transmission words stored within it. The FIFO array 205 also may have a maximum number of transmission words it is able to store. In one embodiment, the FIFO array may have a default threshold level of three words and may be able to store a maximum of six words.

At decision point 320, a sequence of transmission word insertions and deletions may be tracked or counted for a predetermined time period. A transmission word deletion may be indicative of a faster upstream device (i.e., a faster input data transmission rate) relative to a slower downstream device (i.e., a slower output data transmission rate). Similarly, a transmission word insertion may be indicative of a slower upstream device (i.e., a slower input data transmission rate) as compared to a faster downstream device (i.e., a faster output data transmission rate). If only transmission word deletions are tracked for the predetermined time period, in block 330, the transmission word threshold level of the FIFO array 205 may be lowered by an increment of one transmission word. Lowering the transmission word threshold level may reduce the delay of the FIFO array 205 and the loop port as a whole by requiring fewer transmission word deletions. If both transmission word insertions and deletions are tracked for the predetermined time period, the threshold level may be maintained at its original level to account for the possibility that the FIFO array may underflow or overflow due to a changing data transmission rate with respect to an upstream device and a downstream device.

At decision point 340, if the incoming data transmission rate is not greater than the outgoing data transmission rate for a predetermined period of time (i.e., at least one transmission word insertion is tracked for the predetermined time period), the transmission word threshold level for the FIFO array 205 may be examined to determine whether it has been previously lowered. If the transmission word threshold level has been previously lowered, indicating that the upstream device previously had been consistently transmitting data at a slower rate than the downstream device, then the threshold level may be raised by an increment of one transmission word, as depicted in block 350. If the transmission word threshold level has not been previously lowered, the threshold level may be maintained at its current level.

For an embodiment of a FC-AL having a maximum 126 devices connected to the loop, each device having a maximum delay of six transmission words, generally half of the devices connected to the loop may be characterized as having a slower data transfer rate relative to the other half of the devices. Moreover, a data transmission rate difference may always exist between an upstream device and a downstream device. If the upstream device transmits data at a faster rate for a predetermined period of time, the transmission word threshold level for the downstream device may be lowered without underflowing the downstream device's elastic FIFO. If the transmission word threshold level for the downstream device is lowered by one fill character, the loop delay performance may improve by 16.7%. If the transmission word threshold is lowered for half of the devices in the loop, under the theory that half of the devices in the loop may transmit data at a faster rate than the other half of the devices, the transmission word threshold level may be lowered by 1 to 2 transmission words per slow device, yielding a maximum loop delay improvement of % maximum improvement=(2 words*slower devices)/
(maximum delay*126 devices)=(2*63)/(6*126)
=16.7%.

Embodiments of the invention described above may be used in or incorporated in networks where it is desirable to improve the performance by decreasing loop delay. For example, embodiments of the invention describe above may be used to improve the performance of a network having a loop architecture. Embodiments of the invention described above also may be used to reduce the loop delay per loop port in a fibre channel arbitrated loop. Embodiments of the invention described above also may be used in storage area networks where many devices are connected to the network, and where a delay in one device connected to the network may adversely affect the performance of the entire network. In addition to these exemplary embodiments, those skilled in the art will recognize that numerous applications of the above-described embodiments are possible, and that disclosure of the just-described applications does not limit the invention to these applications. Rather, all suitable applications fall within the scope of the invention.

Therefore, the foregoing is illustrative only of the principles of the invention. Further, those skilled in the art will recognize that numerous modifications and changes are possible, the disclosure of the just-described embodiments does not limit the invention to the exact construction and operation shown, and accordingly, all suitable modifications and equivalents fall within the scope of the invention.

What is claimed is:

1. A circuit coupled to a port of a storage network having a loop architecture, said circuit comprising:
   a read/write pointer controller configured to provide a FIFO level indicator to track a total number of transmission words stored in a FIFO array;
   a dynamic threshold controller, responsive to said FIFO level indicator and to transmission word insert and delete commands, configured to track transmission word insertions and deletions in said FIFO array for a predetermined time period and provide a transmission word threshold level adjustment signal based on said tracked transmission word insertions and deletions for said predetermined time period and a transmission word threshold level; and
   a FIFO threshold adjuster, responsive to the FIFO level indicator and the transmission word threshold level adjustment signal, to provide the transmission word insert and delete commands based on both a data transmission rate difference between received input data and transmitted output data and the FIFO level indicator and to adjust the transmission word threshold level based on the transmission word threshold level adjustment signal,
   wherein the transmission words are maintained to account for the data transmission rate difference between received input data and transmitted output data.

2. The circuit of claim 1, wherein said FIFO threshold adjuster adjusts the transmission word threshold level using the transmission word insert and delete commands.

3. The circuit of claim 2, wherein the transmission word threshold level has an initial value of three transmission words.

4. The circuit of claim 2, wherein said dynamic threshold controller provides the transmission word threshold level adjustment signal having a threshold value, the threshold value being lower than said transmission word threshold level if only the transmission word deletions occur during the predetermined time period, and the threshold value being equal to or higher than the transmission word threshold level otherwise.

5. The circuit of claim 4, wherein responsive to the transmission word threshold level adjustment signal, said FIFO threshold adjuster lowers the transmission word threshold level to the threshold value.

6. The circuit of claim 5, wherein the FIFO array has a minimum threshold level of one transmission word.

7. The circuit of claim 4, wherein responsive to the transmission word threshold level adjustment signal, said FIFO threshold adjuster maintains the transmission word threshold level if the threshold value is equal to the transmission word threshold level or raises the threshold level if the threshold value is greater than the transmission word threshold level.

8. The circuit of claim 7, wherein the FIFO array has a maximum threshold level of six transmission words.

9. The circuit of claim 1, wherein said read/write pointer controller further provides a read and a write pointer to track the transmission words stored in the FIFO array.

10. A circuit coupled to a port of a storage network having a loop architecture, said circuit comprising:
    a read/write pointer controller means to provide a FIFO level indicator means to track a total number of transmission words stored in a FIFO array;
    a dynamic threshold controller means, responsive to the FIFO level indicator means and to transmission word insert and delete commands, to track transmission word insertions and deletions in the FIFO array for a predetermined time period and provide a transmission word threshold level adjustment signal based on said tracked transmission word insertions and deletions for the predetermined time period and a transmission word threshold level; and
    a FIFO threshold adjusting means, responsive to the FIFO level indicator and the transmission word threshold level adjustment signal, to provide the transmission word insert and delete commands based on both a data transmission rate difference between received input data and transmitted output data and the FIFO level indicator means and to adjust the transmission word threshold level based on the transmission word threshold level adjustment signal,
    wherein the transmission words are maintained to account for the data transmission rate difference between received input data and transmitted output data.

11. The circuit of claim 10, wherein said FIFO threshold adjusting means adjusts the transmission word threshold level using the transmission word insert and delete commands.

12. The circuit of claim 11, wherein the transmission word threshold level has an initial value of three transmission words.

13. The circuit of claim 11, wherein said dynamic threshold controller means provides the transmission word threshold level adjustment signal having a threshold value, the threshold value being lower than the transmission word threshold level if only the transmission word deletions occur during the predetermined time period, and the threshold value being equal to or higher than the transmission word threshold level otherwise.

14. The circuit of claim 13, wherein responsive to the transmission word threshold level adjustment signal, said FIFO threshold adjusting means lowers the transmission word threshold level to the threshold value, and wherein the FIFO array has a minimum threshold level of one transmission word.

15. The circuit of claim 13, wherein responsive to the transmission word threshold level adjustment signal, said FIFO threshold adjusting means maintains the transmission word threshold level if the threshold value is equal to the transmission word threshold level or raises the threshold level if the threshold value is greater than the transmission word threshold level, and wherein the FIFO array has a maximum threshold level of six transmission words.

16. The circuit of claim 10, wherein the read/write pointer controller means further provides a read and a write pointer to track the transmission words stored in the FIFO array.

17. A method, comprising:
    tracking transmission word insertions and deletions for a predetermined period of time, wherein the transmission word insertions are in response to a slower input data transmission rate relative to an output transmission rate, and wherein the transmission word deletions are in response to a faster input data transmission rate relative to the output transmission rate;
    responsive to said tracking, if only transmission word deletions are tracked for the predetermined period of time, lowering a transmission word threshold level in a computer readable storage medium;
    responsive to said tracking, if both transmission word insertions and deletions are tracked for the predetermined period of time, determining whether the transmission word threshold level in the computer readable storage medium has been previously lowered; and responsive to said determining, raising the transmission word threshold level if the transmission word threshold level has been previously lowered, wherein the transmission words are maintained to account for a difference between the input data transmission rate and the output transmission rate.

18. The method of claim 17, wherein a fill character threshold level has a default level of three fill characters and a minimum level of one fill character, and wherein said lowering and said raising the transmission word threshold level are performed in one transmission word increments.

19. The method of claim 18, further comprising, if the transmission word threshold level equals a default transmission word threshold level and both transmission word insertions and deletions are tracked for the predetermined period of time, maintaining the transmission word threshold level at the default transmission word level.

20. A storage network having a loop architecture, the storage network comprising:

a plurality of ports, each port electrically connected to an upstream port and a downstream port;

a plurality of storage devices, each storage device connected to each port of the plurality of ports; and a circuit according to claim 1 coupled to each port of the plurality of ports, the circuit to adjust data transmission delay in the port based on a data transmission rate difference between data transmitted from the upstream port and data transmitted to the downstream port, wherein the transmission words are maintained to account for the data transmission rate difference between received input data and transmitted output data.

21. The network of claim 20, wherein said FIFO threshold adjuster adjusts said transmission word threshold level using said transmission word insert and delete commands, said transmission word threshold level having an initial value of three transmission words.

22. The network of claim 21, wherein said dynamic threshold controller provides said transmission word threshold level adjustment signal having a threshold value, said threshold value being lower than said transmission word threshold level if only said transmission word deletions occur during said predetermined time period, and said threshold value being equal to or higher than said transmission word threshold level otherwise.

23. The network of claim 22, wherein responsive to said transmission word threshold level adjustment signal, said FIFO threshold adjuster lowers said transmission word threshold level to said threshold value, and wherein said FIFO array has a minimum threshold level of one transmission word.

24. The network of claim 22, wherein responsive to said transmission word threshold level adjustment signal, said FIFO threshold adjuster maintains said transmission word threshold level if said threshold value is equal to said transmission word threshold level or raises said threshold level if said threshold value is greater than said transmission word threshold level, and wherein said FIFO array has a maximum threshold level of six transmission words.

25. The network of claim 20, wherein said read/write pointer controller further provides a read and a write pointer to track the transmission words stored in the FIFO array.

* * * * *